Figure 1:
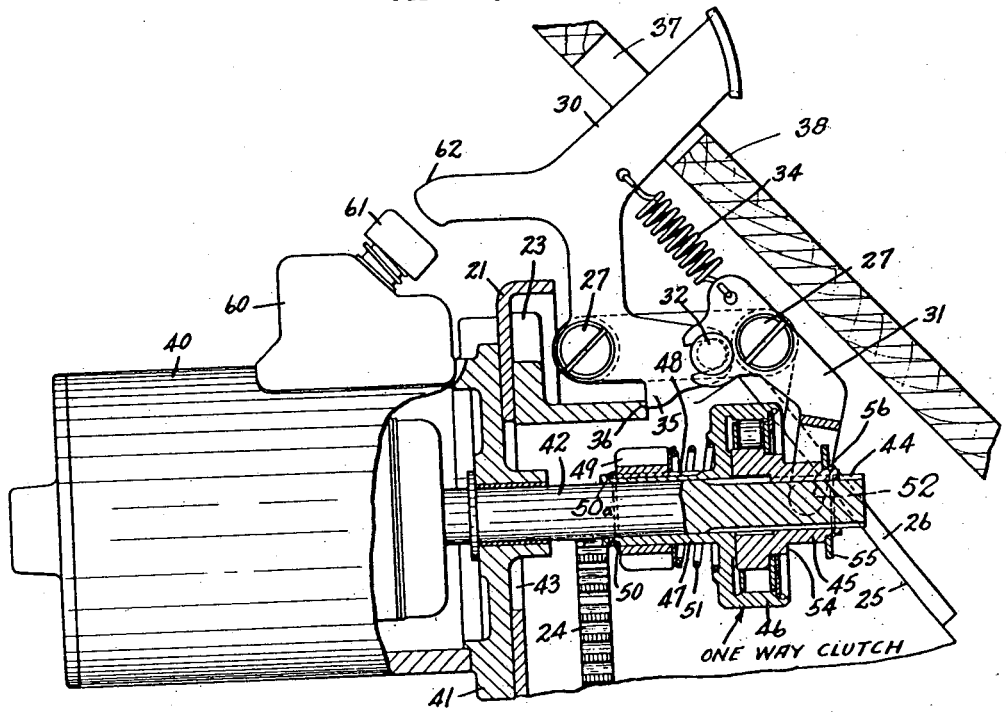

Aug. 7, 1928.

W. A. CHRYST

ENGINE STARTING APPARATUS

Filed May 13, 1925

1,679,405

Patented Aug. 7, 1928.

1,679,405

UNITED STATES PATENT OFFICE.

WILLIAM A. CHRYST, OF DAYTON, OHIO, ASSIGNOR, BY MESNE ASSIGNMENTS, TO DELCO-REMY CORPORATION, OF DAYTON, OHIO, A CORPORATION OF DELAWARE.

ENGINE-STARTING APPARATUS.

Application filed May 13, 1925. Serial No. 29,939.

This invention relates to engine starting apparatus comprising an electric motor, a gear driven by the motor and normally out of engagement with a gear connected with the engine, and manually-operable means for moving the gear into engagement with the engine gear and for enclosing a switch controlling the motor circuit.

One object of the present invention is to provide an engine starting apparatus which will occupy the minimum space under the engine hood of an automotive vehicle. This object is accomplished by providing a motor which is adapted to be secured to the front face of a supporting arm which supports the rear of the engine frame and a transmission housing assembled at the rear end of the engine and which is connected with a side frame member of the vehicle. The arm is provided with an opening leading into the transmission housing which encloses the engine flywheel gear, and this opening receives a shaft driven by the motor. Rearwardly of the arm and below the floor board of the vehicle, a pedal-operated mechanism is located for shifting a gear driven by the motor shaft into mesh with the engine flywheel gear and for closing a switch controlling the motor circuit.

Further objects and advantages of the present invention will be apparent from the following description, reference being had to the accompanying drawings, wherein a preferred form of the present invention is clearly shown.

Figure 2:
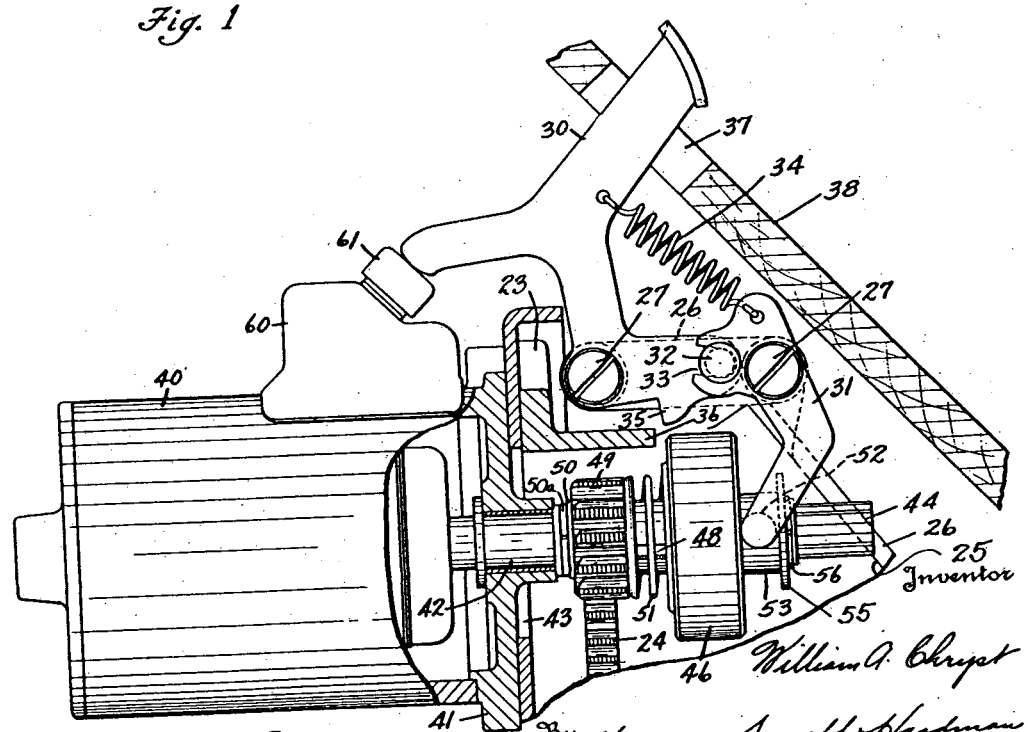

In the drawings:

Figs. 1 and 2 are side views, partly in section, showing the engine starting apparatus in two positions of operation.

A channel cross frame member 21 of the chassis of an automobile supports the transmission housing 23 which encloses a flywheel having a gear 24, and the engine clutch and change speed gearing (not shown). The housing 23 includes an inclined wall 25 which supports a bracket 26. Screws or bolts 27 are attached to the bracket 26 in any suitable manner. One of the bolts 27 pivotally supports a pedal lever 30 and the other bolt 27 pivotally supports a gear-shifting lever 31. Lever 30 carries a stud 32 cooperating with a notched arm 33 of the lever 31. Therefore, the downward movement of the pedal lever 30 producing counterclockwise rotation thereof, will produce clockwise rotation of the lever 31. A spring 34 connects the levers 30 and 31 and tends to maintain the levers in normal position, shown in Fig. 1. The normal position of the lever 30 is maintained by a stop portion 35 thereof, which engages a flange 36 of the transmission housing 23. Pedal lever 30 extends through an opening 37 in the floor board 38.

An electric motor 40 is provided with an end frame 41 which is adapted to be supported against the front face of the cross frame member 21. The motor shaft 42 extends through an opening 43 of the cross frame member 21 and extends rearwardly of the flywheel gear 24. The outer end of the shaft 42 is splined at 44 for sliding engagement with the internal member 45 of a one-way roller clutch which includes an external member 46, which is slidable along the shaft with the internal clutch member 45. The clutch member 46 is provided with a hub 47 which is splined at 48 for sliding engagement with a gear 49 which is yieldingly urged against a stop washer 50 by a spring 51. The washer 50 is retained by a wire split ring 50ª received by a groove in the hub 47. The lever 31 is bifurcated and each arm thereof is provided with a stud or roller 52 received by a groove 53 which is defined by the shoulder 54 of the clutch member 45 and a collar 55 secured upon the reduced end of the clutch member 45 by a wire split ring 56 received by a groove in the member 45.

The motor 40 carries a switch 60 controlling the motor circuit. The motor switch 60 includes a movable plunger 61 located in the path of movement of arm 62 of the lever 30.

The normal position of the starting apparatus is shown in Fig. 1. To start the engine, the pedal lever 30 is depressed to cause the clutch members 45 and 46 and the gear 49 to be moved toward the left from the position shown in Fig. 1, to the position shown in Fig. 2. After the meshing of gears 49 and 24 has been substantially effected, the motor switch 60 will be closed by the engagement of parts 61 and 62. As soon as the engine starts, the gear 49 will overrun the shaft 42 since the clutch is constituted so that the internal clutch member 45 will drive the external member 46 in the direction of the engine cranking rotation of the shaft 42, but the clutch member 46 cannot drive the member 45 in the same direction of rotation. When the pedal 30 is released the spring 34 will return the pedal 30 and the lever 31 to the position shown in Fig. 1. In case of gear teeth abutment during the downward movement of the pedal 30, the spring 51 will yield to permit closing of the motor switch so that the motor may turn the gear 49 into registration with the tooth spaces of the gear 24. When this occurs, the spring 51 will quickly snap the gear 49 into engagement with the gear 24.

The present invention may be used advantageously in automobile installations where the space allowed for the starting apparatus under the engine hood and in front of the rear end of the engine is sufficient only to accommodate the motor frame but not sufficient also for the mechanism for connecting the motor with the engine. This mechanism is located rearwardly of the supporting arm 21 and in the space between the floorboard and the flywheel housing which is usually left vacant.

While the form of embodiment of the invention as herein disclosed, constitutes a preferred form, it is to be understood that other forms might be adopted, all coming within the scope of the claim which follows.

What is claimed is as follows:

Engine starting apparatus comprising, in combination, an electric motor, a motor switch having an operating member, a shaft driven by the motor, a pinion splinedly connected to the shaft and normally spaced from the motor frame, an engine gear adapted to be engaged by the pinion and located in a plane between the motor frame and the pinion, a lever having an arm for engaging the switch operating member, a second lever having an arm for moving the pinion means connecting said arm of the second lever with the pinion for moving the pinion in either direction when the second lever is moved, means pivotally supporting the levers on the same side of the shaft, said levers having arms extending toward one another from their pivots and said last mentioned arms having interconnecting provisions whereby rotation of the first lever toward the switch will cause the second lever to move the pinion into mesh with the gear, and a single helical coil spring connected at its ends with both levers in such manner as to yieldingly maintain the pinion demeshed from the gear and the first lever out of engagement with the switch operating member.

In testimony whereof I hereto affix my signature.

WILLIAM A. CHRYST.